(12) United States Patent
Craig et al.

(10) Patent No.: US 8,108,801 B2
(45) Date of Patent: Jan. 31, 2012

(54) HOST SCREEN TRANSFORMATION FOR MOBILE DEVICES HAVING A REDUCED DISPLAY SIZE

(75) Inventors: Ronald E. Craig, Pittsboro, NC (US); Gerald L. Mitchell, Durham, NC (US); Lori M. Ruffing, Deerfield Beach, FL (US); Masaaki Takamiya, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 12/188,741

(22) Filed: Aug. 8, 2008

(65) Prior Publication Data
US 2010/0037186 A1 Feb. 11, 2010

(51) Int. Cl.
*G06F 3/14* (2006.01)

(52) U.S. Cl. ............ 715/864; 715/760; 715/788

(58) Field of Classification Search ............ 715/744, 715/746, 760, 764, 765, 788, 864, 866; 345/169
See application file for complete search history.

(56) References Cited

U.S. PATENT DOCUMENTS

| | | | | |
|---|---|---|---|---|
| 6,616,700 B1 * | 9/2003 | Thum et al. | ........... | 715/273 |
| 7,216,298 B1 * | 5/2007 | Ballard et al. | ........... | 715/760 |
| 7,360,173 B2 * | 4/2008 | Tuli | ........... | 715/851 |
| 7,823,083 B2 * | 10/2010 | Rohrabaugh et al. | ........... | 715/815 |
| 2003/0182450 A1 * | 9/2003 | Ong et al. | ........... | 709/246 |
| 2006/0100984 A1 * | 5/2006 | Fogg et al. | ........... | 707/1 |
| 2008/0215733 A1 * | 9/2008 | Paul et al. | ........... | 709/225 |

* cited by examiner

*Primary Examiner* — Xiomar L Bautista
(74) *Attorney, Agent, or Firm* — Law Office of Jim Boice (57) ABSTRACT

The present invention provides a method, system and computer program product for improved display of host terminal applications on data processing systems having a small display size. In one embodiment, a host application translator reads characters stored in a character buffer and character attributes stored in an attribute buffer of a computer host terminal application that is displayed to a user as lines of characters. The host application translator performs component recognition on the characters and the character attributes to identify essential characters. Essential characters are characters that are required to be displayed to a user for the user to be able to interact with the computer host terminal application. The host application translator generates hypertext markup language code (HTML) for reconfiguring the characters for display on a portable data processing system having a small display size.

9 Claims, 6 Drawing Sheets

HOST SCREEN TRANSFORMATION FOR MOBILE DEVICES HAVING A REDUCED DISPLAY SIZE

BACKGROUND OF THE INVENTION

To provide users access to a mainframe computer, a host terminal application executing on a computer terminal with limited data processing capability was used to input commands and receive output data from a mainframe computer, replacing the use of punch cards. The computer terminal communicated with the mainframe over a serial data link and displayed information to the user as lines of fixed-width characters. Typically each line displayed 80 characters. Since the characters were fixed-width, characters could be formatted in columns and the formatting would be displayed the same on any computer terminal. As the use of personal computers became more prevalent, host terminal applications were executed on personal computers, replacing the computer terminal. A host terminal application executing on a personal computer enabled a user of the personal computer to communicate with a mainframe computer as if the user were using a computer terminal connected to the mainframe computer.

Today's business users have grown accustomed to the ease of use of modern Web-based applications. Hypertext Markup Language (HTML) conversion technology is used with legacy host terminal applications to provide a quick and easy way to replace traditional displays with a familiar point-and-click interface. HTML conversion technology enables the proven, reliable host terminal applications, which are comparatively more difficult to learn and use, to be modernized with more familiar rich client applications and web-based applications having a graphical user interface.

Mobile data processing systems such as personal digital assistants (PDAs) are becoming more widely-used. PDAs are small enough to fit in the palm of a user's hand. As a result, display sizes are much smaller than a traditional personal computer. When a PDA having a smaller screen is used with legacy host terminal applications and HTML conversion technology, the smaller screen size of the PDA causes usability issues. Host terminal applications were designed for use with computer terminals, which are capable of displaying 80 characters or more in a line. PDAs typically cannot display 80 characters per line in a readable manner. One possible solution is to use a horizontal scroll bar. However, many mobile users prefer scrolling only in the vertical direction and not in the horizontal direction. Another solution is to reduce the size of the application window (effectively "zooming out"). But the small nature of PDA displays limits the extent to which an application window can be reduced while remaining readable. Mobile web browsers (e.g., Internet Explorer Mobile) have their own screen compression options for displaying HTML code. But the screen compression options are designed for displaying web pages, and are not well suited for displaying host terminal applications.

BRIEF SUMMARY OF THE INVENTION

The present invention provides a method, system and computer program product for improved display of host terminal applications on data processing systems having a small display size. In one embodiment, a host application translator reads characters stored in a character buffer and character attributes stored in an attribute buffer of a computer host terminal application that is displayed to a user as lines of characters. The host application translator performs component recognition on the characters and the character attributes to identify essential characters. Essential characters are characters that are required to be displayed to a user for the user to be able to interact with the computer host terminal application. The host application translator generates hypertext markup language code (HTML) for reconfiguring the characters for display on a portable data processing system having a small display size. The HTML code generated by the host application translator include instructions for:

starting a new line of characters in each place where a new line of characters was started in the computer host terminal application;

breaking the new line of characters into more than one line of characters to wrap the characters to the display size;

eliminating the display of characters that are not essential characters;

displaying all said essential characters in a proportional font; and storing the generated HTML code for display on a portable data processing system.

The above, as well as additional purposes, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, as well as a best mode of use, further purposes and advantages thereof, will best be understood by reference to the following detailed description of an illustrative embodiment when read in conjunction with the accompanying drawings, where:

DETAILED DESCRIPTION OF THE INVENTION

An illustrative embodiment of the present invention is directed to a method, system and computer-readable medium for translating a host terminal application into HTML code optimized for display on a portable data processing system having a small display size. The present invention can take the form of an entirely hardware embodiment, an entirely software embodiment or an embodiment containing both hardware and software elements. In an illustrative embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

The medium can be an electronic, magnetic, optical, electromagnetic, infrared or semiconductor system, apparatus or device or a propagation medium. Examples of a computer-readable medium include a semiconductor or solid state memory (e.g., flash drive memory), magnetic tape, a removable computer diskette, a random access memory (RAM), a read-only memory (ROM), a rigid magnetic disk (e.g., a hard drive) and an optical disk. Current examples of optical disks include compact disk-read only memory (CD-ROM), compact disk-read/write (CD-R/W) and Digital Versatile Disk (DVD).

Figure 1:
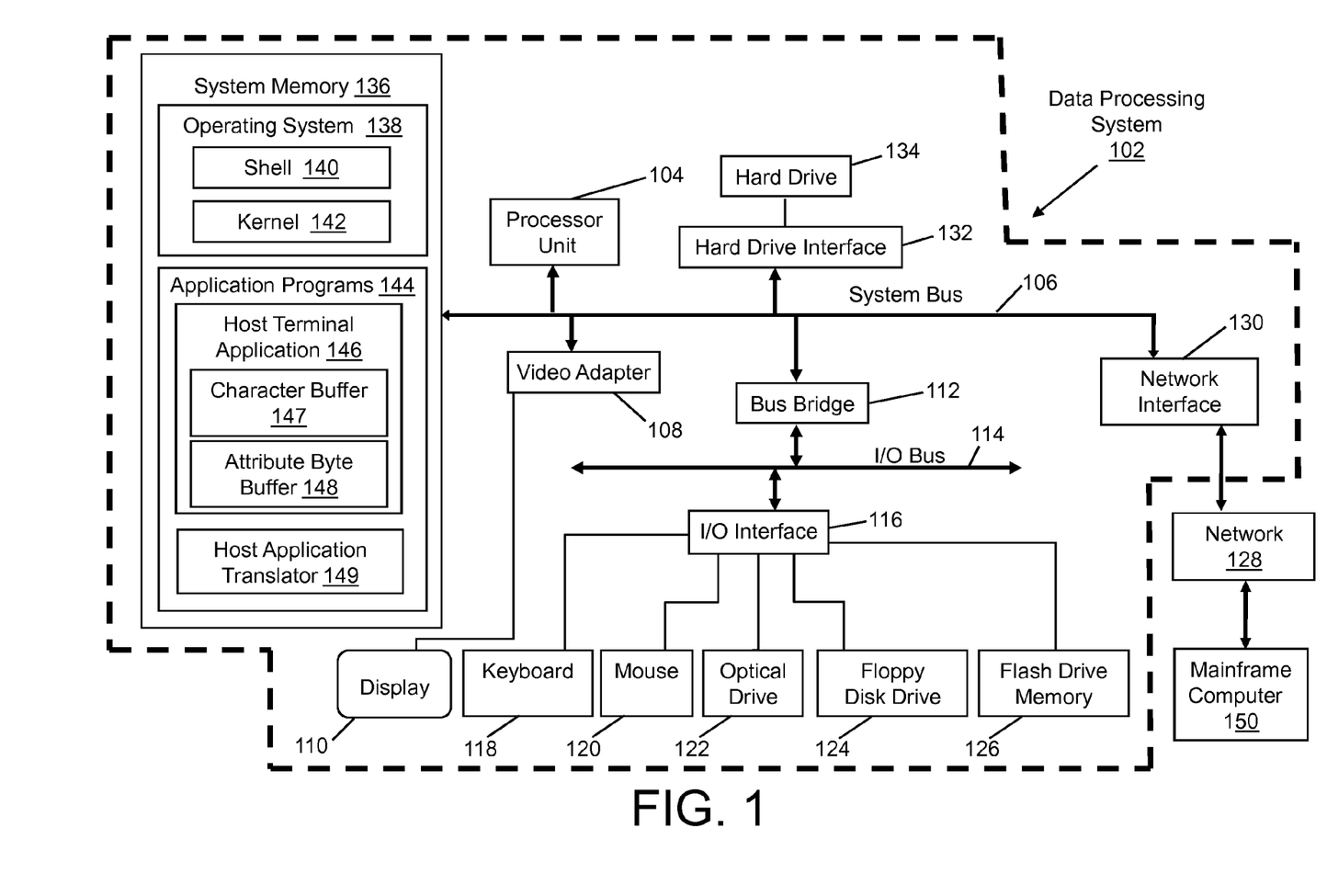
FIG. 1 is a block diagram of an exemplary data processing system in which the present invention may be implemented.

Referring now to the drawings, wherein like numbers denote like parts throughout the several views, FIG. 1 shows a block diagram of a data processing system suitable for storing and/or executing program code in accordance with one or more embodiments of the present invention. Data processing system 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, an optical disk drive 122, a floppy disk drive 124, and a flash drive memory 126. The format of the ports connected to I/O interface 116 may be any known to those skilled in the art of computer architecture, including but not limited to Universal Serial Bus (USB) ports.

Data processing system 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Software deploying server 150 may utilize a similar architecture design as that described for data processing system 102.

A hard drive interface 132 is also coupled to system bus 106. Hard drive interface 132 interfaces with hard drive 134. In a preferred embodiment, hard drive 134 populates a system memory 136, which is also coupled to system bus 106. Data that populates system memory 136 includes an operating system (OS) 138 of data processing system 102 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include host terminal application 146, which enables data processing system 102 to communicate with mainframe computer 150 over network 128. Host terminal application 146 includes character buffer 147 and attribute buffers 148, which are used to store characters and its attributes that are displayed to a user by host terminal application 146. Host Application Translator 149 is an application program that translates the characters in character buffer 146 and the attributes in attribute buffers 148 into hypertext markup language (HTML) code that is suited for displaying on a portable data processing system such as a PDA.

The hardware elements depicted in data processing system 102 are not intended to be exhaustive, but rather are representative to highlight essential components required by the present invention. For instance, data processing system 102 may include alternate memory storage devices such as magnetic cassettes, Digital Versatile Disks (DVDs), Bernoulli cartridges, and the like. These and other variations are intended to be within the spirit and scope of the present invention.

Figure 2:
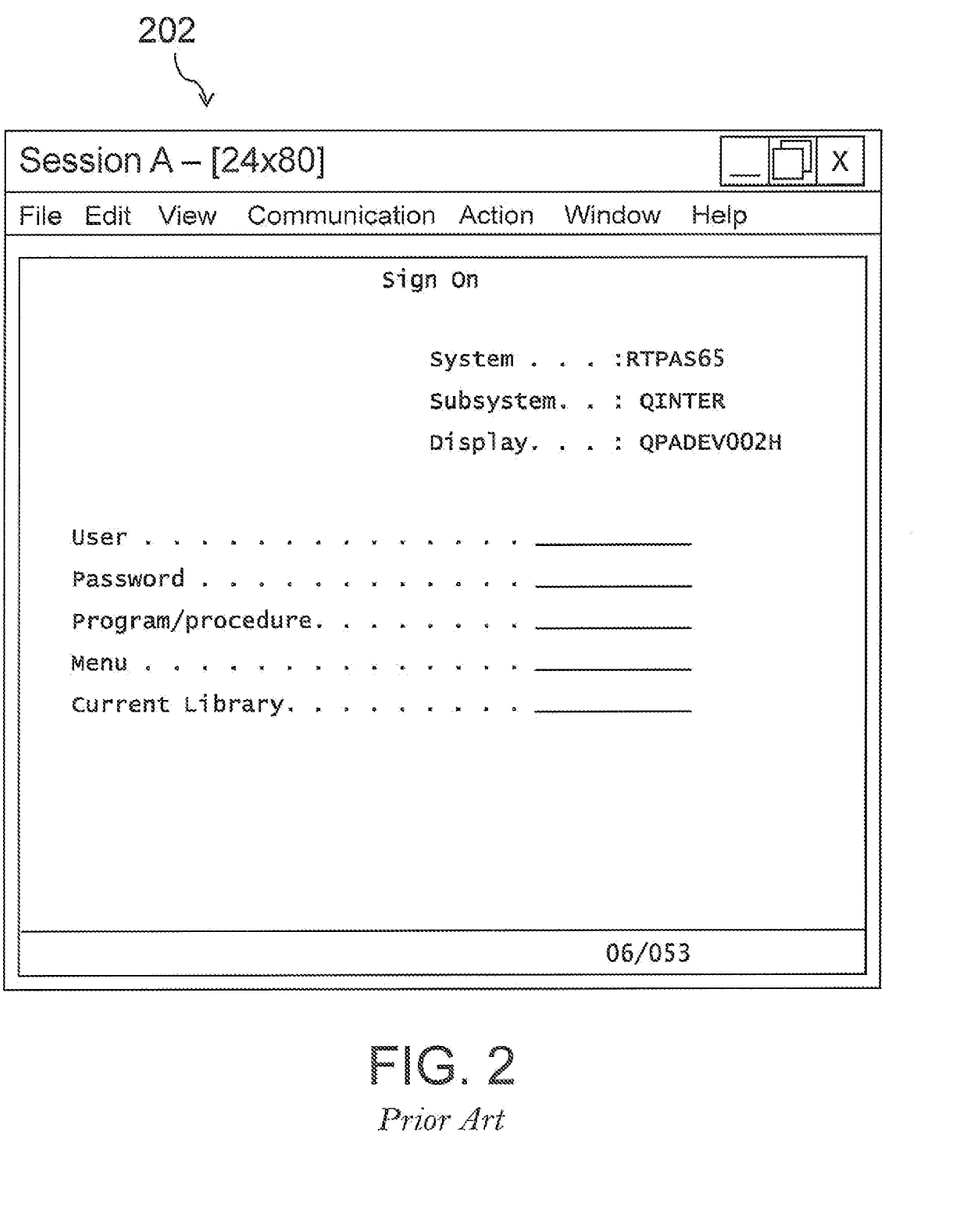
FIG. 2 shows a diagram of a prior art host terminal application displayed on a data processing system.

With reference now to FIG. 2, a diagram of a prior art host terminal application is shown displayed on data processing system 102. Data processing system 102 (e.g., a personal computer) has a large display that is similar in size to a traditional computer terminal. Application window 202 displays the output of host terminal application 146 to a user of data processing system 102, enabling the user to have input/output (I/O) access to mainframe computer 150. Host terminal application 146 displays a fixed number of characters per line, typically 80 characters per line, and a fixed number of lines, such as 25 lines. The characters are stored in character buffer 147 and their attributes are stored in attribute buffers 148. Some characters are used to display words or instructions for the user to read. Other characters represent fields where a user can input information to be transmitted to a mainframe. Attributes of a character in character buffer 147 are retrieved from attribute buffers 148 by the position of the character in character buffer 147. For example, the 55$^{th}$ character (from the left margin) on line 8 may represent the third character in a username field that allows a user to input a username. On a personal computer with a large display resolution, all of the characters in each line can be completely displayed in a readable manner, as shown in FIG. 2.

Figure 3:
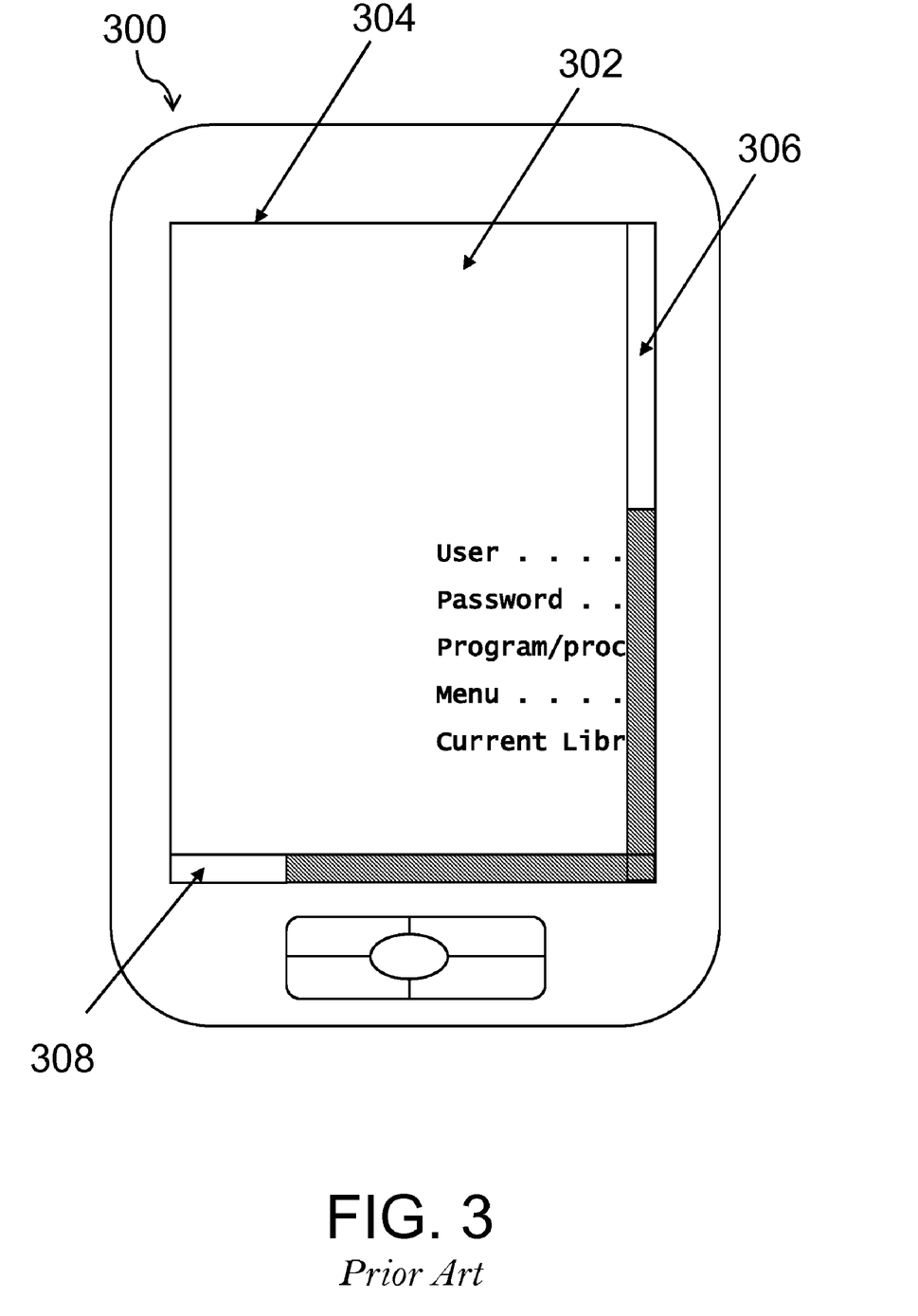
FIG. 3 shows a diagram of a mobile browser application in desktop mode displaying a host application interface on a portable data processing system having a small display size, such as a personal digital assistant (PDA), as is known in the prior art.

With reference now to FIG. 3, a diagram is shown of a mobile browser application in desktop mode displaying a host application interface on a portable data processing system having a small display size, such as a personal digital assistant (PDA), as is known in the prior art. The characters of host terminal application 146 are translated by a host application translator into HTML code that can be read by a standard HTML browser application and displayed to a user in a more modern and familiar format. On PDA 300, the translated HTML code provides the user of PDA 300 I/O access to mainframe computer 150 via mobile browser application 302 executing on PDA 300. Mobile browser application 302 (e.g., Microsoft Internet Explorer Mobile®) is adapted to display HTML code on the smaller display of PDA 300. Typically, mobile browser 300 has several modes with which it displays HTML content. In desktop mode, mobile browser application 302 displays the HTML code as it would be displayed on a desktop PC having a larger display resolution. Host application 146 is displayed with the same fixed number of characters per line on the smaller display 304 of PDA 300. Since display 304 is not capable of displaying 80 characters per line, only a portion of each line is displayed by mobile browser application 302. Scrollbars 306 and 308 are displayed in mobile browser application 302 to enable a user to scroll to see portions of host application 146 that are not currently displayed. Scrolling may be an acceptable solution for larger displays, where horizontal scrolling is minimal. But for the small size of display 304 of PDA 300, horizontal scrolling is not a good solution because an excessive amount scrolling is need to see the entire width of the display.

Figure 4:
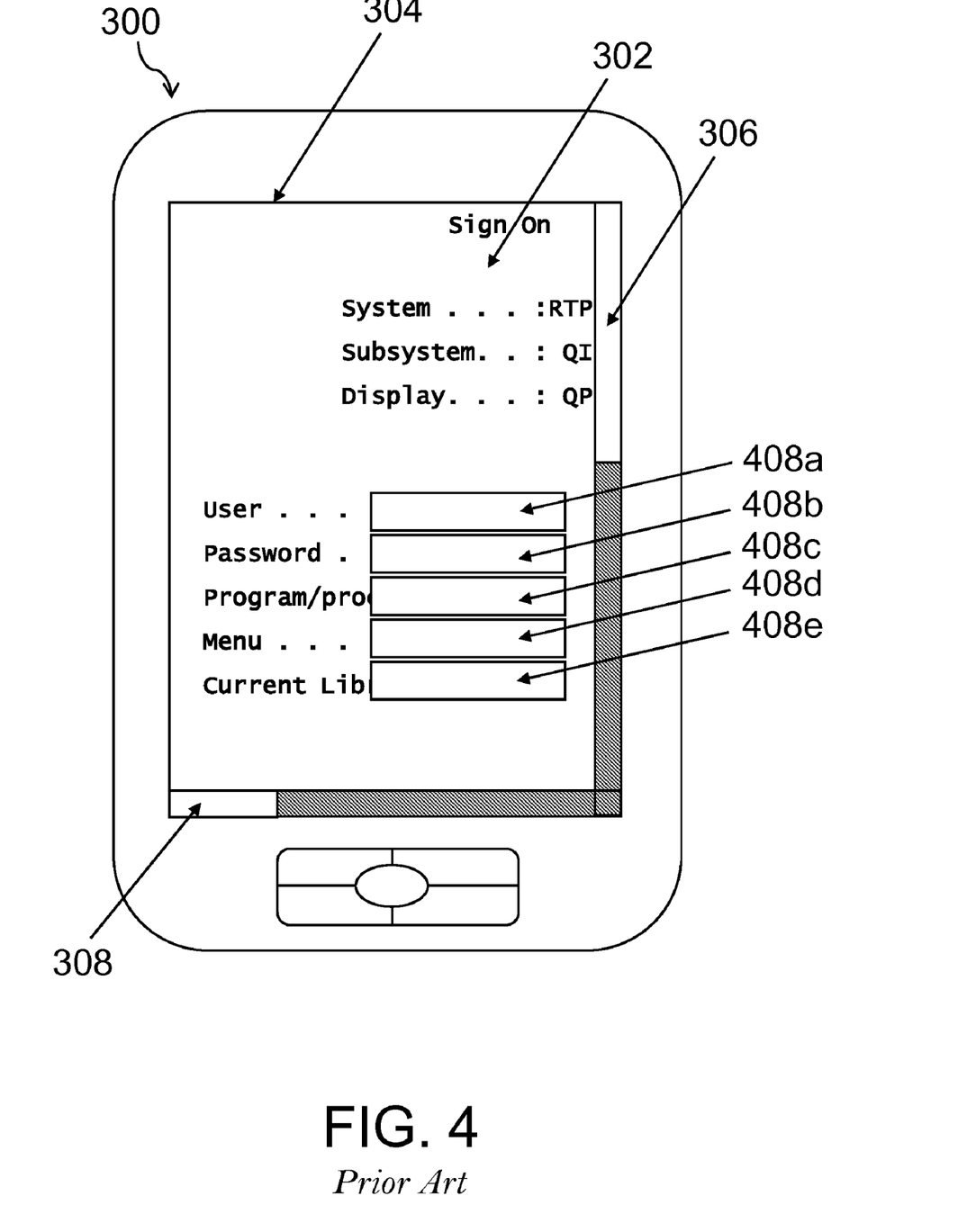
FIG. 4 shows a diagram of a mobile browser application in "fit to screen" mode displaying a host application interface on a portable data processing system having a small display size, such as a personal digital assistant (PDA), as is known in the prior art.

With reference now to FIG. 4, a diagram is shown of a mobile browser application in "fit to screen" mode displaying a host application interface on a portable data processing system having a small display size, such as a personal digital assistant (PDA), as is known in the prior art. In "fit to screen" mode, mobile browser application 302 compresses the display of the host terminal application 146 to fit the width of display 304. The problem with this approach is that text entry fields 408a-e overlap the characters that precede them, making it difficult for the user to determine what information to enter into text entry fields 408a-e. Also, since certain unnecessary or unused spaces are still displayed in the "fit to screen" mode, some horizontal scrolling may still be required.

Figure 5:
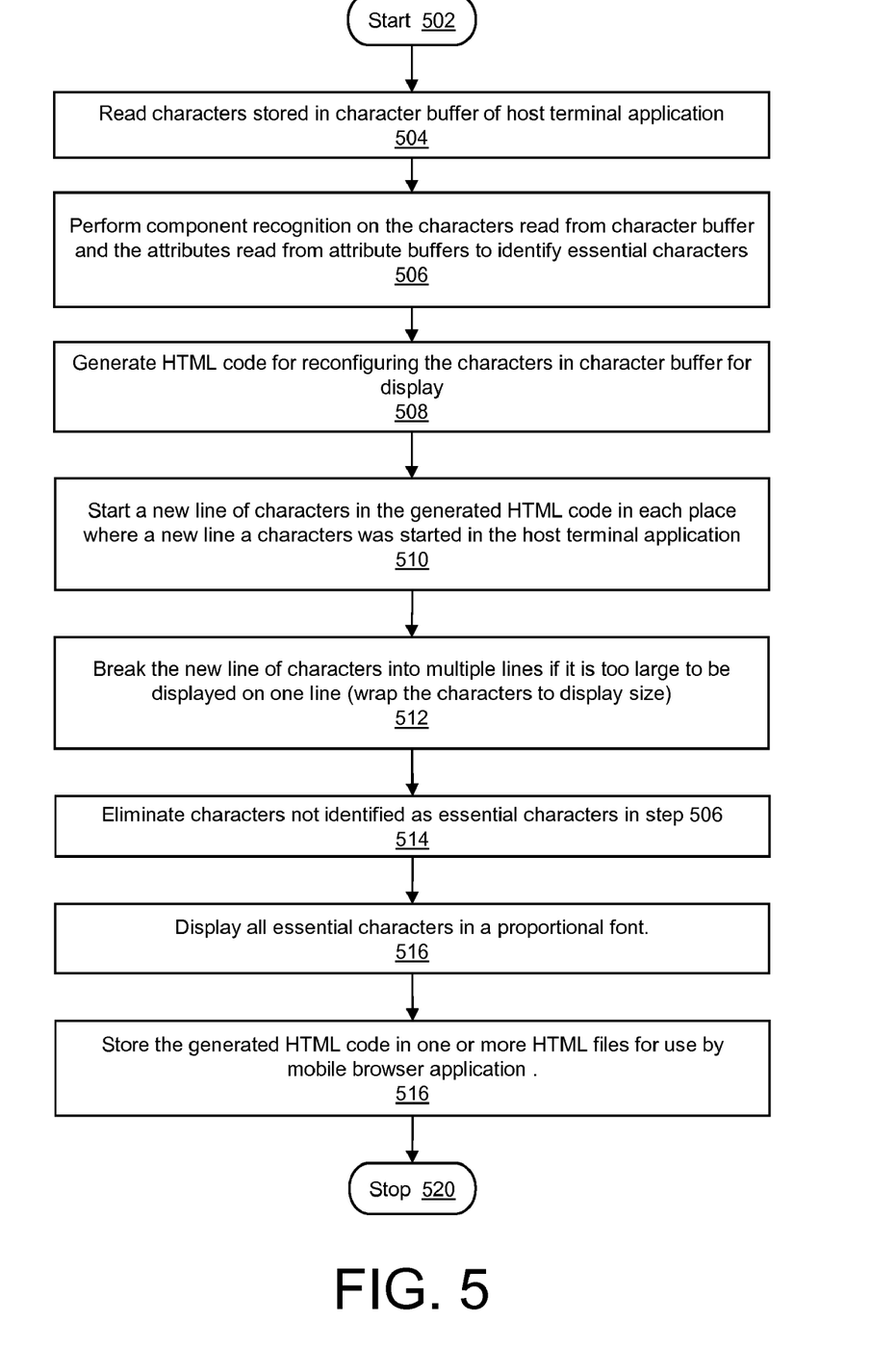
FIG. 5 shows a flowchart depicting a method, in accordance with one or more embodiments of the present invention, for translating a computer host terminal application into an HTML interface that is better suited for display on a portable data processing system.

With reference now to FIG. 5, a flowchart is shown depicting a method, in accordance with one or more embodiments of the present invention, for translating a computer host terminal application into an HTML interface that is better suited for display on a portable data processing system. The process starts at initiator 502. Host Application Translator 149 reads the characters stored in character buffer 147 and the attributes stored in attribute buffers 148 of host terminal application 146 (step 504). Host Application Translator 149 performs component recognition on the characters read from character buffer 147 to identify essential characters (step 506). Essential characters are characters that are required to be displayed for a user to be able to interact with host terminal application 146. Host Application Translator 149 generates HTML code for reconfiguring the characters in character buffer 147 for display on a portable computer system, such as PDA 300 (step 508). Host Application Translator 149 generates the HTML code by applying the following rules. A new line of characters is started in the generated HTML code in each place where a new line of characters was started in host terminal application 146 (step 510). The new line of characters is broken into more than one line if the new line is too large to be displayed on one line to wrap the characters of that line to the size of display 304 (step 512). Characters that are not identified as essential characters during component recognition are eliminated from the generated HTML code (step 514). Eliminated characters include unused or unnecessary space characters and blank static lines. All essential characters are displayed so that no elements overlap any essential characters. All essential characters and are displayed in a proportional font (e.g., a font that has variable character spacing) (step 516). Host Application Translator 149 stores the generated HTML code in one or more HTML files for use by mobile browser application 302 (step 518). The process ends at terminator 520.

Figure 6:
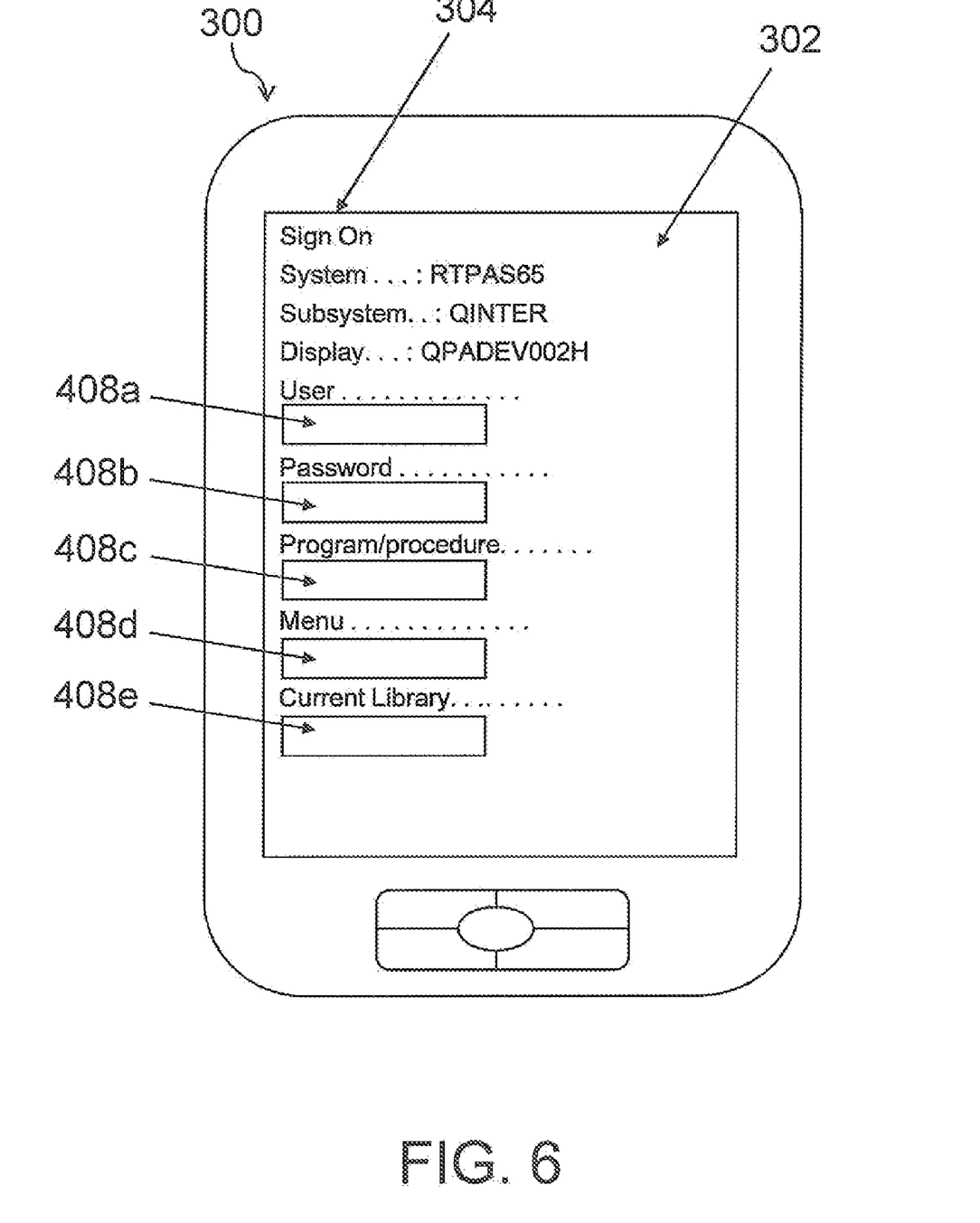
FIG. 6 shows a diagram of a mobile browser application displaying a host application interface generated by a host application translator in accordance with one or more embodiments of the present invention.

With reference now to FIG. 6, a diagram is shown of a mobile browser application displaying a host application interface generated by a host application translator in accordance with one or more embodiments of the present invention. Mobile browser application 302 parses the generated HTML code and displays the translated host application interface as any other HTML code. Special compression is needed to reconfigure the lines in the HTML code to fit the width of display 304. Once the lines are reconfigured, no horizontal scrolling, compression or zooming is needed for the user to interact with host terminal application 146. In the example shown in FIG. 6, text entry fields 408a-e are wrapped to separate lines, while all essential characters are displayed.

By generating HTML code according the method described herein with respect to FIG. 5, mobile browser application 302 can display the HTML code without mobile browser application 302 having to perform any special reformatting for the smaller display size of display 304 and without the user having to use scroll bars.

While the present invention has been particularly shown and described with reference to an illustrative embodiment, it will be understood by those skilled in the art that various changes in form and detail may be made therein without departing from the spirit and scope of the invention. Furthermore, as used in the specification and the appended claims, the term "computer" or "computer system" or "computing device" includes any data processing system including, but not limited to, personal computers, servers, workstations, network computers, mainframe computers, routers, switches, Personal Digital Assistants (PDA's), telephones, and any other system capable of processing, transmitting, receiving, capturing and/or storing data. The term "system" or "information system" includes a network of data processing systems.

The flowchart and diagrams in the Figures illustrate the architecture, functionality, and operation of possible implementations of systems, methods and computer program products according to various embodiments of the present invention. In this regard, each block in the flowchart or diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to illustrative embodiments thereof, it will be apparent that modifications and variations are possible without departing from the scope of the invention defined in the appended claims.

What is claimed is:

1. A method in a data processing system comprising:
   reading a plurality of characters stored in a character buffer and a plurality of character attributes stored in an attribute buffer of a computer host terminal application, wherein said computer host terminal application is displayed to a user as a plurality of lines of said plurality of characters;
   performing component recognition on said plurality of characters and said plurality of character attributes to identify essential characters, wherein said essential characters are required to be displayed to a user for said user to be able to interact with said computer host terminal application;
   generating hypertext markup language code for reconfiguring said plurality of characters for display on a portable data processing system having a small display that has a small display size, wherein said generating comprises:
      starting a new line of characters at a position on the small display where an original version of the line of characters was originally started in said computer host terminal application;
      breaking said original line of characters into more than one line of characters in order to wrap said original line of characters such that said new line of characters fits within said small display size;
      eliminating the display of characters from the plurality of characters that are not essential characters; and
      displaying all of said essential characters on said small display; and
   storing said generated hypertext markup language code for display on said portable data processing system.

2. The method of claim 1, wherein said essential characters are displayed in a proportional font.

3. The method of claim 1, wherein some characters from the plurality of characters represent words for a user of the portable data processing system to read.

4. The method of claim 3, wherein other characters from the plurality of characters represent fields in which a user of the portable data processing system can input information to be transmitted to a server.

5. The method of claim 4, wherein the words and fields are not initially fully visible on the small display in the original version of the line of characters, and wherein said reconfiguring said plurality of characters further comprises:
   repositioning the words and the fields on the small display such that the words and the fields are both fully visible on the small display.

6. A system comprising:
   a processor;
   a data bus coupled to said processor;
   a memory coupled to said data bus; and
   a computer readable storage device encoded with computer program code that, when executed, causes control circuitry in said system to perform the steps of:
      reading a plurality of characters stored in a character buffer and a plurality of character attributes stored in an attribute buffer of a computer host terminal application, wherein said computer host terminal application is displayed to a user as a plurality of lines of said plurality of characters;
      performing component recognition on said plurality of characters and said plurality of character attributes to identify essential characters, wherein said essential characters are required to be displayed to a user for said user to be able to interact with said computer host terminal application;
      generating hypertext markup language code for reconfiguring said plurality of characters for display on a portable data processing system having a small display that has a small display size, wherein said generating comprises:
         starting a new line of characters at a position on the small display where an original version of the line of characters was originally started in said computer host terminal application;
         breaking said original line of characters into more than one line of characters in order to wrap said original line of characters such that said new line of characters fits within said small display size;
         eliminating the display of characters from the plurality of characters that are not essential characters; and
         displaying all of said essential characters on said small display; and
      storing said generated hypertext markup language code for display on said portable data processing system.

7. The system of claim 6, wherein, said essential characters are displayed in a proportional font.

8. A computer-readable storage device encoded with a computer program product that, when executed, causes control circuitry in a data processing system to perform the steps of:
   reading a plurality of characters stored in a character buffer and a plurality of character attributes stored in an attribute buffer of a computer host terminal application, wherein said computer host terminal application is displayed to a user as a plurality of lines of said plurality of characters;
   performing component recognition on said plurality of characters and said plurality of character attributes to identify essential characters, wherein said essential characters are required to be displayed to a user for said user to be able to interact with said computer host terminal application;
   generating hypertext markup language code for reconfiguring said plurality of characters for display on a portable data processing system having a small display that has a small display size, wherein said generating comprises:
      starting a new line of characters at a position on the small display where an original version of the line of characters was originally started in said computer host terminal application;

breaking said original line of characters into more than one line of characters in order to wrap said original line of characters such that said new line of characters fits within said small display size;
eliminating the display of characters from the plurality of characters that are not essential characters; and
displaying all of said essential characters on said small display; and
storing said generated hypertext markup language code for display on said portable data processing system.

9. The computer-readable storage device of claim 8, wherein said essential characters are displayed in a proportional font.

* * * * *